United States Patent [19]

Hakansson

[11] Patent Number: 4,615,121
[45] Date of Patent: Oct. 7, 1986

[54] DEVICE FOR A CHAIN SAW FOR THE SLITTING OF BARK LAYERS OF A LOG

[75] Inventor: Sigurd Hakansson, Gottne 5337, S-89042, Mellansel, Sweden

[73] Assignees: Sigurd Hakansson, Mellansel; Ergonomen HB, Domsjö; Arne Lindahl, Domsjö, all of Sweden; a part interest to each

[21] Appl. No.: 679,953

[22] Filed: Dec. 10, 1984

[30] Foreign Application Priority Data

Jun. 10, 1983 [SE] Sweden ................. 8303300

[51] Int. Cl.[4] .................................. B27B 17/02
[52] U.S. Cl. .................................. 30/371; 30/382; 30/383
[58] Field of Search ............... 30/371, 381, 382, 383; 83/574

[56] References Cited

U.S. PATENT DOCUMENTS

| 3,051,203 | 8/1962 | Hayden | 83/574 X |
| 3,091,851 | 6/1963 | Cummins | 30/371 |
| 3,092,156 | 6/1963 | Hayden | 143/32 |
| 4,063,358 | 12/1977 | Hodge | 30/382 X |
| 4,297,786 | 11/1981 | Tuggle | 30/382 |
| 4,304,275 | 12/1981 | Glover | 30/371 X |

Primary Examiner—Frank T. Yost
Attorney, Agent, or Firm—Nils H. Ljungman

[57] ABSTRACT

A device is disclosed to make slits through the bark of a log with a chain saw. The chain saw has a blade with a chain which runs over its extreme free end which is preferably semicircular in shape. Rotatable guide rollers are mounted on both sides of the extreme end of the blade and are preferably coaxial with the semicircular end. The lateral surfaces of the guide rollers face each other and guide rollers in operation hold the chain of the chain saw in contact with a log to be cut for cutting slits of a given depth through its bark.

20 Claims, 3 Drawing Figures

DEVICE FOR A CHAIN SAW FOR THE SLITTING OF BARK LAYERS OF A LOG

BACKGROUND OF THE INVENTION

1. Field of the Invention

The invention relates to a device for the slitting of bark layers and birch-bark layers on logs in order to achieve controlled drying of the wood.

2. Description of the Prior Art

Wood has always been of great importance as fuel and recently, wood has become more important as raw material for the pulp and paper industry. The building industry is an additional important area of use for wood and lumber.

It is very important when using wood as fuel that the wood be as dry as possible when being utilized. In order to speed up the drying process, the wood is, therefore, usually split into logs and stacked for air-drying. The splitting process is time consuming and expensive and the main disadvantage is that the volume of wood increases considerably after the splitting, which makes the transport and storage costs very high.

When using the wood in the pulp industry, the tree trunks are debarked in order to facilitate the drying process and to prevent rotting. As in the splitting process, the debarking is also time consuming and costly. In those cases when the wood is stored unbarked, the remaining high moisture content results in rot and this is especially true if the stored logs consist of hardwood. In the storage of logs with the bark thereon substantially intact for one year with the resulting high moisture content in the wood, up to 10% of the wood would be unusable and the quality of the pulp produced would be poorer.

The logs which are to be sawed into boards, etc., must be seasoned slowly in order to avoid the formation of cracks and, therefore, the bark cannot be completely removed from the trunks before the drying process.

SUMMARY OF THE INVENTION

A simple device is being disclosed herein to avoid the above-mentioned disadvantages and to solve the above problem. This device can be used immediately by the logger at the logging area. This device can provide a fast and simple slitting of the bark of the log or the bark of the birch. This slitting of the bark can be done by the device right up to the wood or into the wood, so that a controlled, desired drying process will result.

In order to solve the problem at hand, the invention comprises a device on a chain saw for the slitting of bark layers and birch-bark layers of logs. The chain saw includes a blade with a bearing arrangement at its extremity at the end of the blade which is opposite the motor, as is well known in the art. The chain runs over the free end of the blade opposite the motor. The chain saw may include a freely rotatable guide roller mounted on each side of the blade and coaxially with the bearing arrangement at the extremity of the blade. The lateral surfaces, facing each other, of the guide rollers may converge toward the bearing arrangement.

The invention resides broadly in a kit for installation on a chain saw, a blade of said chain saw having a chain for movement along said blade at at least a first end of said blade opposite a motor of said chain saw, said kit, when assembled on said chain saw, being disposed, in operation of said chain saw, at said first end, and guiding said chain at said first end, in operation, a predetermined distance into a log such as to slit at least a bark layer of said log, said kit comprising: means mountable, on said saw blade and in proximity of said first end of said saw blade, for making contact, in operation, with said log to dispose said chain of said chain saw, moving over said first end of said blade, in a predetermined position with respect to said log, such that, said first end, in operation, is disposed, by said means mountable on said blade on said first end of said chain saw, at said predetermined distance into said log for slitting at least said layer of bark of said log, said predetermined distance determined by components of said kit when assembled on said chain saw such that said chain extends, in operation, into said log a distance not exceeding substantially less than a radius of said log.

The guide rollers can be mounted without any difficulty on the existent types of chain saws and the total weight is only increased insignificantly in a portable handheld saw, since the guide rollers can be made of lightweight material, for example, aluminum or plastic, which are mounted on either side of the blade. In some chain saws, the existent axis for the tip or free end of the chain saw blade can be replaced by an axis which is common to the guide rollers and the semicircular free end of the blade.

One important advantage of placing the guide rollers coaxially with the axis of rotation of the chain about the free end of the blade is that it will be safe to operate the saw, since the guide rollers for retaining the chain will form an end shield on the chain saw, whereby the angle of the blade against the longitudinal axis of the log will not affect the sawing depth. A tip of the blade at the free end thereof is preferably circular.

The drying process can be completely controlled by a choice of the number of longitudinal slits which are made in the bark. The drying can take place at the logging area and, consequently, logs with a low moisture content can then be transported to a site for their processing or use.

This preferable drying at the logging area produces a considerable decrease in the weight of the wood to be transported thereby substantially lowering the transportation costs. A particularly important advantage is that the occurrence of rot is almost completely eliminated or at least diminished to a great extent, if not the greatest possible extent.

BRIEF DESCRIPTION OF THE DRAWINGS

A preferred embodiment of the invention is described in the following in connection with the attached drawings, in which.

DESCRIPTION OF THE PREFERRED EMBODIMENT

Figure 1:
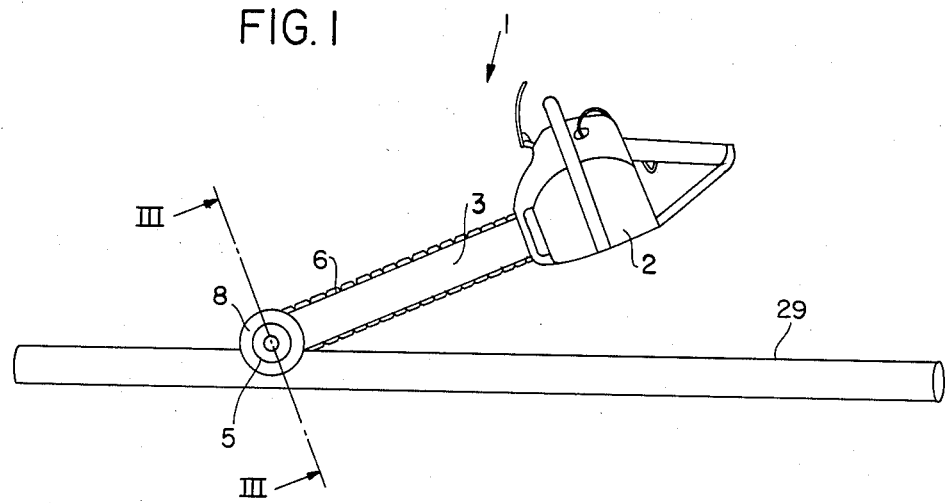
FIG. 1 shows the invention as seen from the side during the slitting of the bark in the longitudinal direction of the log.
Figure 2:
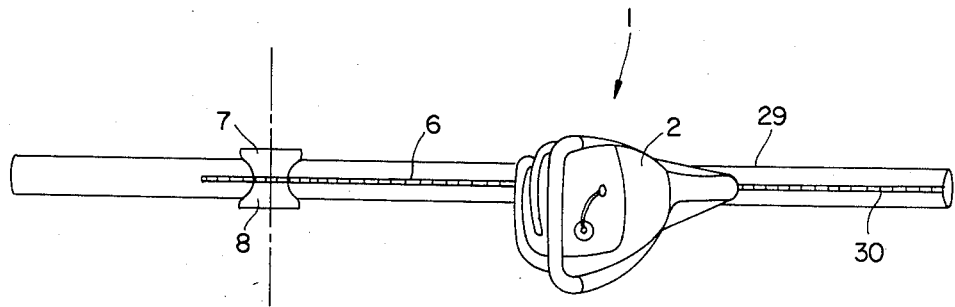
FIG. 2 shows the device according to FIG. 1, as seen from above.
Figure 3:
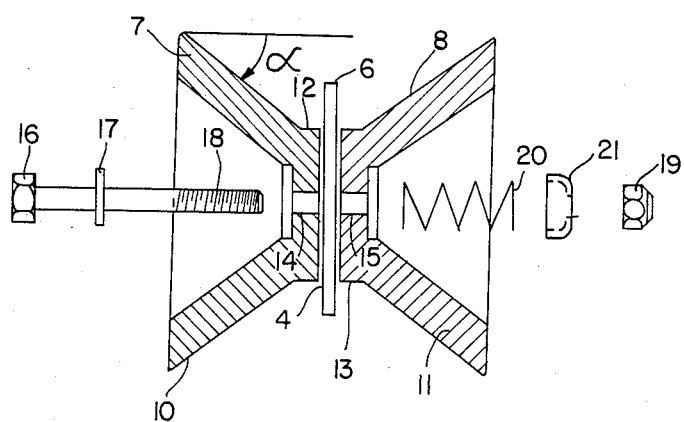
FIG. 3 shows a section along line III—III in FIG. 1.

FIGS. 1 and 2 show a conventional portable, hand held chain saw 1 with a motor section 2 containing an internal combustion engine or an electric motor. A blade 3 projects from the motor section 2. The blade 3 can be of any suitable type and on its free end turned away from the motor section 2, it has a bearing arrangement 4 (as shown in FIG. 3), so that a saw chain 6 is freely rotatable on an axis 5 mounted preferably over bearings of the bearing arrangement 4 in the blade 3. The saw chain 6, driven by the motor, runs over the bearing arrangement 4. The bearing arrangement 4 preferably has a diameter which corresponds essentially to the height of the blade 3, and the outermost semicircular part of the bearing arrangement 4 consequently forms a track for the outermost section of the saw chain 6. The nomenclature "bearing arrangement" also includes in a chain saw a simple track without any bearings per se. The diameter of the semicircular part preferably pass through the axis 5. According to the invention, a first guide roller 7 and a second guide roller 8 are mounted in the bearing arrangement 4 on each side of the blade 3 and on the axis 5. The guide rollers 7 and 8 are symmetrically rotational and identical, as well as preferably coaxial with the semicircular bearing arrangement 4. In order to obtain the required control in the longitudinal direction of a tree trunk 29, the contact surfaces 10 and 11, facing each other, of the two guide rollers 7 and 8 are designed as frustums of cones with the narrow ends 12 and 13 turned toward the blade 3. To decrease the weight of the guide rollers, they are preferably designed as hollow cones with their narrow ends 12 and 13 facing the blade 3, as shown in FIG. 3.

In the example presented, a bolt 16 extends through the holes 14 and 15 along the axis 5 and through the guide rollers 7 and 8 which are aligned with each other and also possibly with an existing center hole at the tip or free end of the blade 3 in the bearing arrangement 4. There preferably is, when assembled, a washer 17 between the head 16 of the bolt and the outer wall of the first guide roller 7. The threaded end 18 of the bolt interacts with a nut 19 and the guide roller 8 with a compression spring 20, the outer end of which is received in a retainer 21. Other spring arrangements known from the prior art may also be used. As shown in FIG. 3, the inner section of each guide roller must have a diameter which is less than the width of the blade, so that the saw chain 6 is able to saw down into the bark of the log 29, at least through the bark into the outer wood layer. The cone angle, between the axis of the cone and the conical surface of the cone, should be greater than 15° and preferably between 20° and 60°, so that there is good control of the chain saw 1 when a slit 30 is made in the bark. The angle depends, to a certain degree, on the size of the guide rollers, which are then adjusted to the wood size occurring most commonly in a particular application of the saw.

The guide rollers 7 and 8, which are preferably freely rotatable in relation to the bearing arrangement 4 and the blade 3 are, however, preferably shiftable axially in relation to each other. According to FIG. 3, at least one of the guide rollers 7 and 8 is preferably spring loaded, and by changing the pressure of the guide rollers 7 and 8 against the log 29, the guide rollers are moved relative to each other. As the axial distance increases and when the distance diminishes, the depth of the saw cut will also decrease.

It has been assumed in the above that the contact surfaces of the guide rollers 7 and 8, facing each other, are designed as straight frustums of cones but, for example, it is also possible to make the surfaces partly spherical. The most important thing is that both surfaces converge toward the blade 3.

The invention is not to be taken as limited to all the details that are described hereinabove, since modifications and variations thereof may be made without departing from the spirit or scope of the invention.

What is claimed is:

1. A kit for making slits in logs, said kit for installation on a chain saw, a blade of said chain saw having a chain for movement along said blade at least at a first end of said blade opposite a motor of said chain saw, said kit, when assembled on said chain saw, for being disposed, in operation of said chain saw, at said first end, and guiding said chain at said first end, whereby in operation, said saw with said kit installed thereon is for slitting at least a bark layer of a round log, said kit comprising:

two separate mountable means each consisting of a sole member, each sole member having a substantially circular portion and each sole member being directly mountable, one on each side of and abutting said saw blade;

said two sole members for being mounted substantially opposite one another on opposite sides of and in proximity of said first end of said saw blade, whereby said two sole members each make contact with a round log when said two sole members are mounted on said saw blade and when said chain saw is in operation, at least when said saw is being moved therealong for making a lengthwise cut therein.

2. The kit according to claim 1 wherein said two sole members comprise a pair of guide rollers, each mounted, in operation, on either side of said blade, whereby, in operation, both of said guide rollers make substantial contact with a log being slit.

3. The kit according to claim 2 wherein said guide rollers each have at least one outer surface which comprises a frustum of a cone which frustum has a portion having smaller diametrical dimension and a portion having a larger diametrical dimension and wherein said portion having said smaller diametrical dimension being mounted, in operation, closer to said blade than said portion having said larger diametrical dimension.

4. The kit according to claim 3 wherein said guide rollers are substantially identical and are circularly conical in shape.

5. The kit according to claim 4 wherein said guide rollers have a cone angle, defined between an axis of said cone and an outer surface thereof, exceeding 15°.

6. The kit according to claim 5 including a spring for being disposed between one of said guide rollers and said blade.

7. The kit according to claim 5 wherein said blade has a hole at said first end of said blade, said hole having an axis therethrough, and said guide rollers defining an axis on which they are mountable in use, said axis of said guide rollers being substantially common, in operation, with said axis of said hole at said first end of said blade.

8. The kit according to claim 4 including bearings, and wherein at least one of said guide rollers is mounted, in operation, in said bearings which axially yield in relation to said blade.

9. The kit according to claim 8 including a spring for being disposed between one of said guide rollers and said blade.

10. The kit according to claim 8 wherein said blade has a hole at said first end of said blade, said hole having an axis therethrough, and said guide rollers defining an axis on which they are mountable in use, said axis of said guide rollers being substantially common, in operation, with said axis of said hole at said first end of said blade.

11. The kit according to claim 4 wherein said blade has a hole at said first end of said blade, said hole having an axis therethrough, and said guide rollers defining an axis on which they are mountable in use, said axis of said guide rollers being substantially common, in operation, with said axis of said hole at said first end of said blade.

12. The kit according to claim 3 including bearings, and wherein at least one of said guide rollers is mounted, in operation, in said bearings which axially yield in relation to said blade.

13. The kit according to claim 12 including a spring for being disposed between one of said guide rollers and said blade.

14. The kit according to claim 12 wherein said blade has a hole at said first end of said blade, said hole having an axis therethrough, and said guide rollers defining an axis on which they are mountable in use, said axis of said guide rollers being substantially common, in operation, with said axis of said hole at said first end of said blade.

15. The kit according to claim 3 wherein said blade has a hole at said first end of said blade, said hole having an axis therethrough, and said guide rollers defining an axis on which they are mountable in use, said axis of said guide rollers being substantially common, in operation, with said axis of said hole at said first end of said blade.

16. The kit according to claim 2 including bearings, and wherein at least one of said guide rollers is mounted, in operation, in said bearings which axially yield in relation to said blade.

17. The kit according to claim 16 including a spring for being disposed between one of said guide rollers and said blade.

18. The kit according to claim 17 wherein said blade has a hole at said first end of said blade, said hole having an axis therethrough, and said guide rollers defining an axis on which they are mountable in use, said axis of said guide rollers being substantially common, in operation, with said axis of said hole at said first end of said blade.

19. The kit according to claim 16 wherein said blade has a hole at said first end of said blade, said hole having an axis therethrough, and said guide rollers defining an axis on which they are mountable in use, said axis of said guide rollers being substantially common, in operation, with said axis of said hole at said first end of said blade.

20. The kit according to claim 2 wherein said blade has a hole at said first end of said blade, said hole having an axis therethrough, and said guide rollers defining an axis on which they are mountable in use, said axis of said guide rollers being substantially common, in operation, with said axis of said hole at said first end of said blade.

* * * * *